S. C. NELSON.
WHEEL RIM.
APPLICATION FILED DEC. 21, 1917.
1,299,378.
Patented Apr. 1, 1919.
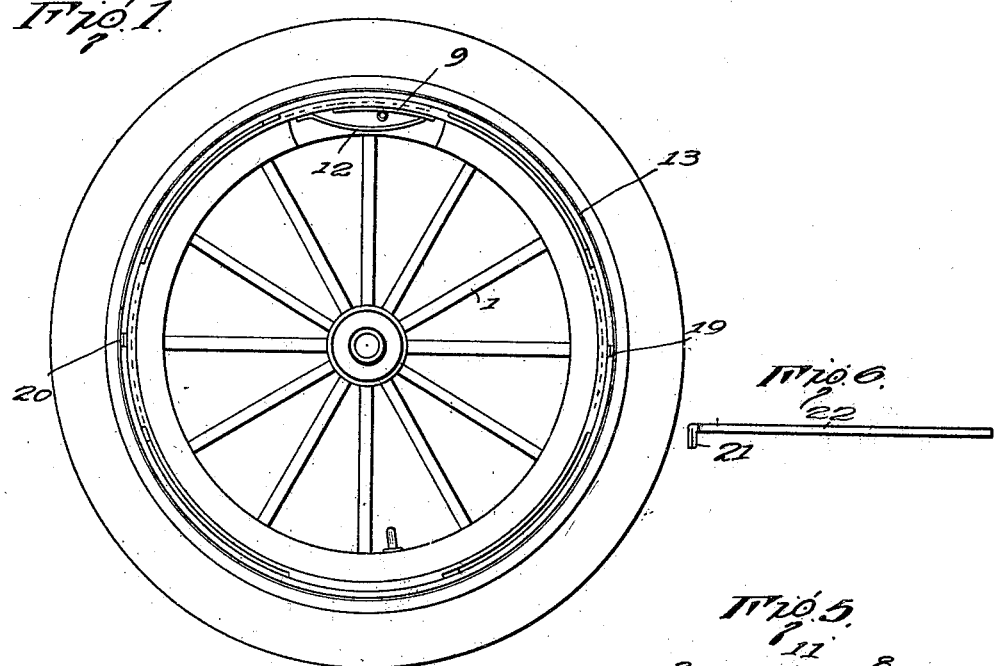
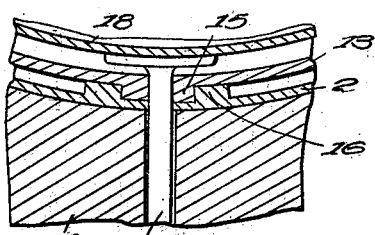
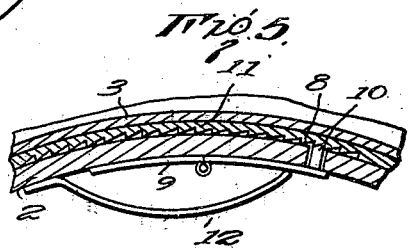
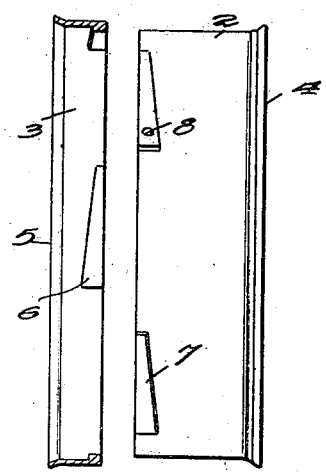
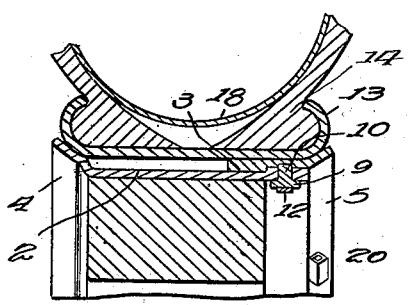
Steve C. Nelson
Inventor
By Geo. P. Kimmel
Attorney

UNITED STATES PATENT OFFICE.

STEVE C. NELSON, OF FINLEY, NORTH DAKOTA.

WHEEL-RIM.

1,299,378.   Specification of Letters Patent.   Patented Apr. 1, 1919.

Application filed December 21, 1917. Serial No. 208,289.

*To all whom it may concern:*

Be it known that I, STEVE C. NELSON, a citizen of the United States, residing at Finley, in the county of Steele and State of North Dakota, have invented certain new and useful Improvements in Wheel-Rims, of which the following is a specification.

This invention relates to improvements in wheel rims and it is the dominant object of the invention to provide a sectional wheel rim for securing pneumatic and other forms of tires to the wheels of vehicles in a manner to enable the quick removal or demounting of the same, thus, effecting a material saving of time and labor upon part of the user.

Another and equally important object of the invention is to provide a novel form of locking means, whereby the rim will serve to positively hold and support a tire against undue movement or displacement.

The improvements in the details and arrangement of parts will be apparent from an inspection of the accompanying drawings, in connection with the specific description hereinafter contained, and wherein the preferred embodiment of the invention is disclosed for the purpose of imparting a full understanding of the same.

In the drawings:—

Figure 1 is a side elevation of the improved rim as applied to a vehicle wheel,

Fig. 2 is a fragmental vertical longitudinal section therethrough,

Fig. 3 is an end view of the wheel rim sections disassembled, the secondary rim section being shown in section, Fig. 4 is a fragmental vertical transverse section through the wheel, rim, and tire engaged thereby, Fig. 5 is a fragmental longitudinal section showing the arrangement of the locking means for holding the rim sections against relative rotation, and Fig. 6 is a detail in elevation of the wrench for rotating the secondary rim section.

Having more particular reference to the drawings, in connection with which like reference characters will designate corresponding parts throughout the several views, 1 represents the wheel to which my improved sectional rim is applied, the rim including main and secondary sections designated by the numerals 2 and 3 respectively. It will be noted, that the outer marginal portion of the main rim section is provided with an oblique flange 4, while the corresponding portion of the secondary rim section is provided with a similar flange 5, this flange, obviously, being disposed at a less acute angle than the flange 4. Arranged upon the adjacent portions of the main and secondary rim sections 2 and 3 are a plurality of lugs 6 and 7, which as will be noted, have certain of the sides thereof beveled to cause movement of said secondary rim section onto the main rim section when interengaged. An opening 8 is formed in the main rim section and passes through one of the lugs 7 for a purpose which will be presently apparent.

Secured to the under side of the secondary rim section 3 is a pivotally jointed locking element 9 having a beveled pin 10 arranged upon the outer end thereof adapted to pass upwardly through the main rim section to engagement with a ratchet plate 11 secured upon the inner side of the secondary rim section 3. Obviously, by engaging the beveled pin 10 with the adjacent teeth of the ratchet 11, relative rotary movement of the rim sections 2 and 3 will be prevented. To normally maintain the beveled pin 10 in engagement with the ratchet plate 11, a spring arm 12 is also secured to the under side of the main rim section 2 at a point directly above the locking element 9 and is adapted to engage the free end of the same.

A demountable rim 13 is provided and is adapted to receive the heel portions of the ordinary pneumatic tire shoe 14 therein. To the underside of the demountable rim is secured a lug 15, while spaced lugs 16 are arranged upon the outer face of the main rim section 2 to one side of the same and serve to snugly receive the lug 15 therebetween. With the lugs thus engaged, it will be readily understood that relative rotary movement of the main rim section 2 and the demountable rim 13 will be prevented. Therefore, the valve stem 17 of the tire inner tube 18 which passes through suitable alined openings formed in the demountable rim, the main rim section 2 and the wheel felly will be prevented from being distorted or fractured due to such movement.

Secure to the secondary rim section preferably upon the under side of the flange 5 thereof is a boss or teat 19 which allows the rim to be lightly tapped with a hammer or other implement in order that the same may be rotated with respect to the main rim section during the disassembling of the improved wheel rim.

Arranged upon the flange 5 of the secondary rim section opposite to the arrangement of the boss 19 is a loop 20, this loop serving as means for receiving the squared shank portion 21 of a wrench 22 whereby the secondary rim section may be rotated with relation to the main rim section during assembling or disassembling operations.

In operation, the demountable rim 13 having an inflated tire arranged thereon is positioned upon the main rim section 2, whereupon the secondary rim section 3 is engaged thereover and rotated to cause the beveled sides of the lugs 6 and 7 to engage each other. Obviously, by rotating the secondary rim section through the medium of the wrench 22 which, as hereinbefore stated, is engaged with the loop 20, said secondary rim section will be caused to move over and onto the adjacent portion of the main rim section and as a consequence, the flanged portions 4 and 5 of said rim sections will be tightly engaged with the adjacent portions of the demountable rim 13, thus, securely positioning the same upon the wheel 1 in a manner to prevent accidental displacement or disarrangement thereof. As means for locking the secondary rim section in position upon the main rim section, the beveled pin 10 of the locking element 9 is engaged with the adjacent tooth of the ratchet plate 11 secured to the under side of said secondary rim section.

Manifestly, the construction shown is capable of considerable modification and such modification as is within the scope of my claims, I consider within the spirit of my invention.

I claim:—

A device of the character described including complemental rim sections adapted to be fitted one over the other, spaced circumferentially disposed lugs having their opposite sides formed oblique arranged on said sections adjacent the inner sides thereof, said lugs being adapted to be interengaged by rotating one of said sections on the other, locking means on said rim sections for preventing relative rotary movement between said rim sections subsequent to interengagement of the lugs, a tool receiving loop carried on the side of one of said sections, a demountable rim received on said rim sections, a transverse apertured rib formed on the lower side of said demountable rim adjacent the valve receiving opening therein, and spaced transverse guide elements on the upper portion of one of said rim sections for slidably receiving said apertured rib therein, the adjacent portion of said rim section being formed with an opening for permitting the valve stem of a tire engaged on the demountable rim to pass therethrough.

In testimony whereof, I affix my signature hereto.

STEVE C. NELSON.